US012611292B2

(12) United States Patent
Davies-Smith

(10) Patent No.: US 12,611,292 B2
(45) Date of Patent: Apr. 28, 2026

(54) TOOTH WHITENING APPARATUS

(71) Applicant: Colgate-Palmolive Company, New York, NY (US)

(72) Inventor: Leighton Davies-Smith, Lebanon, NJ (US)

(73) Assignee: Colgate-Palmolive Company, New York, NY (US)

( * ) Notice: Subject to any disclaimer, the term of this patent is extended or adjusted under 35 U.S.C. 154(b) by 296 days.

(21) Appl. No.: 18/453,375

(22) Filed: Aug. 22, 2023

(65) Prior Publication Data

US 2024/0065818 A1 Feb. 29, 2024

Related U.S. Application Data

(60) Provisional application No. 63/401,759, filed on Aug. 29, 2022.

(51) Int. Cl.
| | |
|---|---|
| *A61C 19/06* | (2006.01) |
| *A45D 34/04* | (2006.01) |
| *A45D 40/26* | (2006.01) |

(52) U.S. Cl.
CPC .......... *A61C 19/066* (2013.01); *A45D 34/045* (2013.01); *A45D 34/046* (2013.01); *A45D 40/265* (2013.01); *A45D 40/267* (2013.01)

(58) Field of Classification Search
CPC .. A61C 19/066; A61C 19/063; A45D 34/045; A45D 34/046; A45D 40/265; A45D 40/267
USPC ................................. 401/121, 122, 126–130
See application file for complete search history.

(56) References Cited

U.S. PATENT DOCUMENTS

| | | | |
|---|---|---|---|
| 3,987,921 | A | 10/1976 | Aichinger |
| 4,007,848 | A | 2/1977 | Snyder |
| 4,241,743 | A | 12/1980 | Schnabel et al. |
| 4,738,370 | A | 4/1988 | Urmston et al. |
| 4,761,088 | A | 8/1988 | Zubek |

(Continued)

FOREIGN PATENT DOCUMENTS

| | | |
|---|---|---|
| KR | 20190060080 | 6/2019 |
| WO | 2012/126120 | 9/2012 |

OTHER PUBLICATIONS

International Search Report and the Written Opinion of the International Searching Authority issued in International Application PCT/US2023/030763 mailed Dec. 8, 2023.

*Primary Examiner* — David J Walczak

(57) ABSTRACT

A tooth whitening apparatus which includes a container having a cavity containing a tooth whitening composition and an applicator assembly which includes a cap, a rod member coupled to the cap and protruding from a bottom end of the cap and having a longitudinal axis, an outer surface, and a distal portion, and an applicator tip coupled to the distal portion of the rod member. The applicator assembly is alterable between: (1) an attached state whereby the cavity of the container is sealed; and (2) a detached state whereby the applicator assembly is separated from the container to apply the tooth whitening composition onto a user's teeth. The outer surface of the rod member includes at least one vent groove that is elongated in a direction of the longitudinal axis to reduce a pressure in the cavity of the container when altering the applicator assembly into the attached state.

20 Claims, 9 Drawing Sheets

(56) References Cited

U.S. PATENT DOCUMENTS

| | | | | |
|---|---|---|---|---|
| 5,224,787 A * | 7/1993 | Vasas | .................. | A45D 40/265 |
| | | | | 401/128 |
| 5,611,687 A | 3/1997 | Wagner | | |
| 5,722,545 A | 3/1998 | Rinne | | |
| 6,276,856 B1 | 8/2001 | Pieper et al. | | |
| 6,517,350 B2 | 2/2003 | Diasti et al. | | |
| 7,887,328 B2 | 2/2011 | Brown et al. | | |
| 8,070,374 B2 * | 12/2011 | Gueret | ................ | A45D 34/045 |
| | | | | 401/129 |
| 8,376,746 B2 | 2/2013 | Brown et al. | | |
| 8,815,216 B2 | 8/2014 | Prencipe et al. | | |
| 9,282,810 B2 | 3/2016 | Rajaiah et al. | | |
| 9,624,010 B2 | 4/2017 | Harper | | |
| 10,702,052 B2 | 7/2020 | Jimenez et al. | | |
| 2003/0232310 A1 | 12/2003 | Matthews et al. | | |
| 2004/0096261 A1 * | 5/2004 | Gueret | .................. | A46B 9/021 |
| | | | | 132/74.5 |
| 2008/0274066 A1 | 11/2008 | Montgomery | | |
| 2009/0074679 A1 | 3/2009 | Silverman | | |
| 2009/0214284 A1 * | 8/2009 | Gueret | ................ | A45D 40/265 |
| | | | | 401/121 |
| 2015/0000699 A1 | 1/2015 | Kelsey | | |

* cited by examiner

FIG. 4A          FIG. 4B

TOOTH WHITENING APPARATUS

CROSS-REFERENCE TO RELATED APPLICATIONS

The present application claims the benefit of priority to U.S. Provisional Patent Application Ser. No. 63/401,759, filed Aug. 29, 2022, the entirety of which is incorporated herein by reference.

BACKGROUND

Tooth whitening is an increasingly popular treatment and dentists and patients alike are searching for techniques that are both convenient and comfortable while also being effective. Typically, to whiten a user's teeth a composition containing hydrogen peroxide is applied to the teeth and allowed to remain in contact with the teeth to be bleached for a period of time. Existing systems and apparatus for whitening teeth suffer from deficiencies, such as product effectiveness, whitening composition clumping on the applicator, issues related to priming of the application device, and consistent application onto the teeth. Thus, a need exists for a tooth whitening apparatus which remedies the deficiencies in existing products.

BRIEF SUMMARY

The present invention is directed to a tooth whitening apparatus which includes a container having a cavity containing a tooth whitening composition and an applicator assembly which includes a cap, a rod member coupled to the cap and protruding from a bottom end of the cap and having a longitudinal axis, an outer surface, and a distal portion, and an applicator tip coupled to the distal portion of the rod member. The applicator assembly is alterable between: (1) an attached state whereby the cavity of the container is sealed; and (2) a detached state whereby the applicator assembly is separated from the container to apply the tooth whitening composition onto a user's teeth. The outer surface of the rod member includes at least one vent groove that is elongated in a direction of the longitudinal axis to reduce a pressure in the cavity of the container when altering the applicator assembly into the attached state.

In one aspect, the invention may be a tooth whitening apparatus comprising: a container comprising a first engagement feature and a cavity containing a tooth whitening composition; an applicator assembly comprising: a cap comprising a second engagement feature; a rod member coupled to the cap and protruding from a bottom end of the cap, the rod member comprising a longitudinal axis, an outer surface, and a distal portion; and an applicator tip coupled to the distal portion of the rod member; wherein the applicator assembly is alterable between: (1) an attached state whereby at least a portion of the rod member and the applicator tip are located within the cavity of the container and the second engagement feature of the cap engages with the first engagement feature of the container to couple the applicator assembly to the container and seal the cavity; and (2) a detached state whereby the applicator assembly is separated from the container and the applicator tip is configured to apply the tooth whitening composition onto a user's teeth; and wherein the outer surface of the rod member comprises at least one vent groove that is elongated in a direction of the longitudinal axis to reduce a pressure in the cavity of the container when altering the applicator assembly into the attached state.

In another aspect, the invention may be a tooth whitening apparatus comprising: a container comprising a first set of screw threads and a cavity containing a tooth whitening composition; an applicator assembly comprising: a cap comprising an inner surface that defines a cap cavity, the inner surface comprising a second set of screw threads that are configured to engage with the first set of screw threads to detachably couple the cap to the container to seal the cavity; a rod member coupled to the inner surface of the cap and protruding from a bottom end of the cap, the rod member comprising a longitudinal axis and an outer surface having a plurality of grooves that are elongated in a direction of the longitudinal axis along a majority of a length of the rod member; and an applicator tip coupled to the rod member and configured to apply the tooth whitening composition directly to a user's teeth when the applicator assembly is detached from the container.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figures 1, 2:
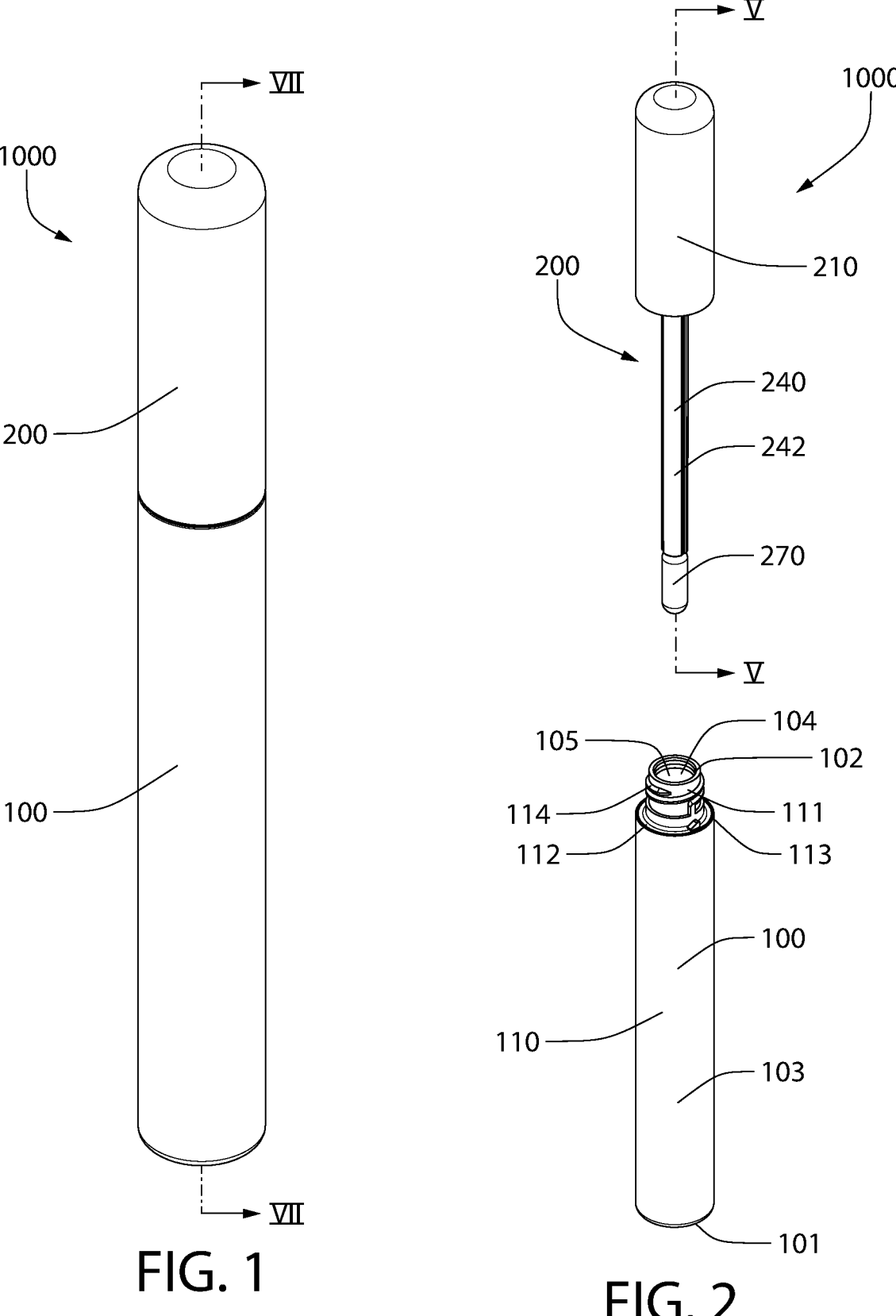
FIG. 1 is a perspective view of a tooth whitening apparatus including a container and an applicator assembly with the applicator assembly in an attached state in accordance with an embodiment of the present invention.
FIG. 2 is a perspective view of the tooth whitening apparatus of FIG. 1 wherein the applicator assembly is in a detached state.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Figure 3:
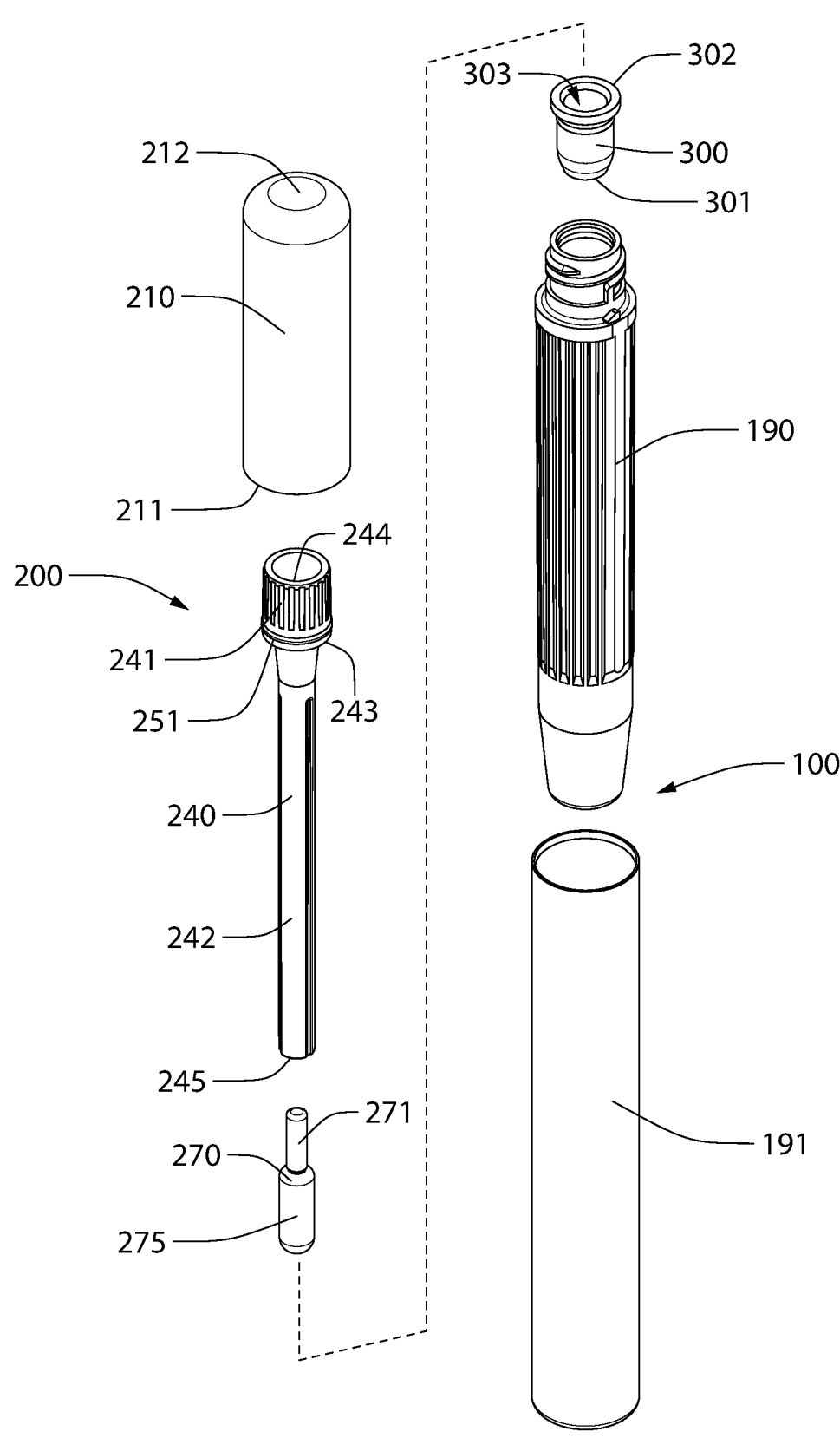
FIG. 3 is an exploded perspective view of the tooth whitening apparatus of FIG. 1.

Referring to FIGS. 1-3, a tooth whitening apparatus 1000 is illustrated in accordance with an embodiment of the present invention. The tooth whitening apparatus 1000 is a device which stores a tooth whitening composition and facilitates the application of the tooth whitening composition onto a user's teeth to perform a tooth whitening function. The tooth whitening apparatus 1000 may be similar to devices typically used for storage and application of lip gloss, such as a wand applicator, in some embodiments. Although described herein as a tooth whitening apparatus, the device may be an applicator apparatus in other embodiments and may not be specified for applying a composition onto a user's teeth. In particular, the device may be used to apply a composition onto other parts of a user, such as the skin, lips, gums, hair, nose, or the like.

The tooth whitening apparatus 1000 generally comprises a container 100 and an applicator assembly 200. The applicator assembly 200 is configured to be repetitively attached to and detached from the container 100. Specifically, FIG. 1 illustrates the applicator assembly 200 in an attached state such that the applicator assembly 200 is attached to the container 100. FIG. 2 illustrates the applicator assembly 200 in a detached state such that the applicator assembly 200 is detached from the container 100. In the detached state, the applicator assembly 200 may be used to apply a tooth whitening composition onto a user's teeth to perform a whitening function. When the applicator assembly 200 is in the attached state, an applicator tip 270 of the applicator assembly 200 becomes loaded with a tooth whitening composition which is stored in the container 100. Then, when the applicator assembly 200 is altered into the detached state, the tooth whitening composition that is loaded on the applicator assembly 200 may be applied directly to a user's teeth.

The user may need to dip the applicator assembly 200 into the container 100 one or more times during a single treatment session in order to adequately coat each of the desired teeth with the tooth whitening composition. The amount of times that the applicator assembly 200 needs to be dipped into the container 100 during a treatment session may be dictated by user preference and/or by instructions included with the tooth whitening apparatus 1000. That is, the tooth whitening apparatus 1000 may be sold with instructions which advise the user to apply the tooth whitening composition to all of the visible teeth with a single dip of the applicator assembly 200 into the container 100. Alternatively, the instructions may advise the user to dip the applicator assembly 200 into the container 100 multiple times during a single treatment session to adequately coat all of the teeth desired to be whitened (i.e., dip between application onto each tooth, dip between application onto each set of three teeth, etc.).

In the exemplified embodiment, the tooth whitening apparatus 100 has a generally cylindrical overall shape when the applicator assembly 200 is in the attached state. However, the container 100 and the applicator assembly 200 may have other shapes in other embodiments to achieve various aesthetic goals. Moreover, the container 100 may be cylindrical and a cap of the applicator assembly 200 may have a different shape. The various shapes of the container 100 and the cap of the applicator assembly 200 are not to be limiting of the invention disclosed herein in all embodiments.

As best shown in FIG. 3, the container 100 may comprise an inner housing 190 and an outer sleeve 191 that surrounds the inner housing 190. The inner housing 190 may be formed from a hard plastic material such as polypropylene. The outer sleeve 191 may be formed from a metal such as aluminum. The outer sleeve 191 may be affixed to the outer surface of the inner housing 190 using adhesives like glue, tape, epoxy, or the like, via an ultrasonic welding technique, or using other connection techniques. The outer sleeve 191 may form the portion of the container 100 which is visible to the user, and thus the outer sleeve 191 may be adorned with ornamental features, labels, text, indicia, imagery, or the like if so desired. Alternatively, the outer sleeve 191 may comprise one or more colors and have a smooth and sleek outer appearance. The outer sleeve 191 may also include a window through which the inner housing 190 may be visible. In such embodiments, the inner housing 190 may be transparent, such that a user can see an amount of the composition remaining in the container 100 through the window. While the container 100 is illustrated herein as having the inner container 190 and the outer sleeve 191, in other embodiments the container 100 may be formed from a single component. That is, the container 100 may comprise the inner housing 190 only and the outer sleeve 191 may be omitted.

The applicator assembly 200 generally comprises a cap 210, a rod member 240 that is coupled to the cap 210, and an applicator tip 270 that is coupled to the rod member 240. The cap 210, the rod member 240, and the applicator tip 270 are coupled together to form an integral structure such that the parts move collectively when the applicator assembly 200 is altered between the attached state (FIG. 1) and the detached state (FIG. 2). The cap 210 may be formed from acrylonitrile butadiene styrene (ABS) or other hard plastic materials, or the cap 210 may be formed from metal like aluminum or the like. The rod member 240 may be formed from a hard plastic material such as polybutylene terephthalate (PBT) for example. The applicator tip 270 may comprise an attachment rod 271 formed from a hard plastic material such as PBT or the like, for example, and a tip member 275 which may be formed from a foam material, such as polyurethane foam, for example. Of course, other materials may be used for the tip member 275, including without limitation polyester, polyether, or the like. The tip member 275 may be the portion of the applicator assembly 200 which is loaded with the tooth whitening composition and then placed into direct contact with the user's teeth to apply the tooth whitening composition onto the user's teeth. The foam for the tip member 275 may be selected so as to be capable of being loaded with the tooth whitening composition while also being compatible with the tooth whitening composition. The various materials listed herein for each of the different parts are merely exemplary and it should be appreciated that other materials can be used.

The tip member 275 may not be formed from foam in all embodiments. In other embodiments, the tip member 275 may comprise bristles (single tuft PBT bristles, for example), silicone, thermoplastic elastomer, or the like.

In addition to the aforementioned components, additional details of which will be provided below, the tooth whitening apparatus 1000 may further comprise a wiper component 300. When the tooth whitening apparatus 1000 is assembled, the wiper component 300 is fixedly coupled to the container 100. The wiper component 300 may be formed from polyethylene, such as low density polyethylene or LDPE. The wiper component 300 may be positioned within the container 100 so as to wipe excess amounts of the tooth whitening composition off of the rod member 240 and the applicator tip 270 as the applicator assembly 200 is being altered from the attached state of FIG. 1 to the detached state of FIG. 2.

Figure 4:
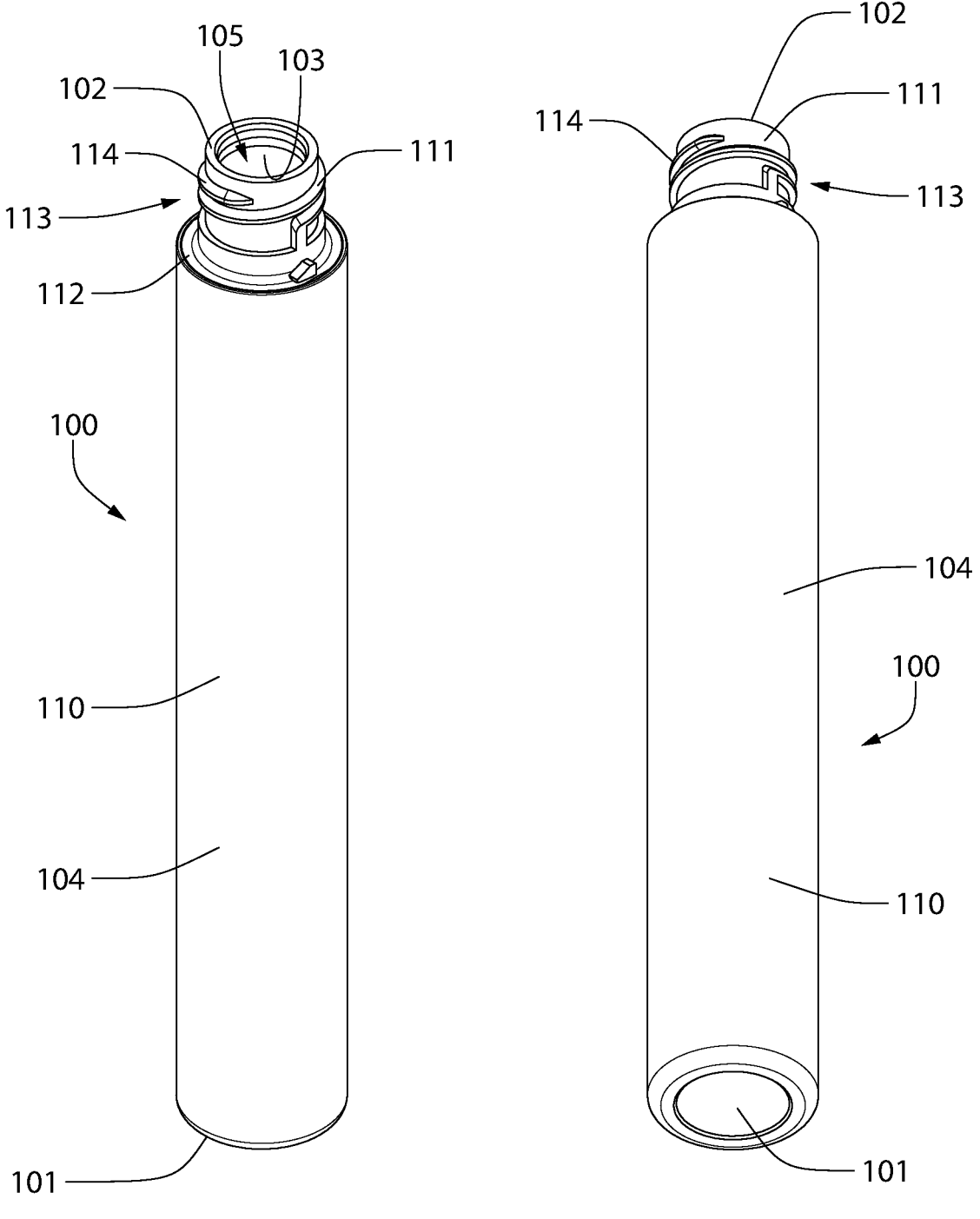
FIG. 4A is a top perspective view of the container of the tooth whitening apparatus of FIG. 1.
FIG. 4B is a bottom perspective view of the container of FIG. 4A.

Referring now to FIGS. 2, 4A, and 4B, the container 100 will be further described. The container 100 is depicted as having a cylindrical shape in the exemplified embodiment. However, other shapes may be used for the container 100 and the invention is not to be limited by the shape in all embodiments. The container 100 comprises a bottom end 101, a top end 102, an inner surface 103, and an outer surface 104. The inner surface 103 of the container 100 defines a cavity 105 that is configured to store a tooth whitening composition. A tooth whitening composition 500 is shown in the cavity 105 of the container 100 in FIG. 7B, which will be described in greater detail below. The top end 102 of the container 100 may define an opening that forms a passageway from the ambient environment into the cavity 105. The container 100 may comprise a main body portion 110 and a neck portion 111. The main body portion 110 may terminate at an annular shoulder 112 and the neck portion 111 may protrude from the annular shoulder 112 to the top end 102 of the container 100. The neck portion 111 may comprise a first engagement feature 113 that is configured to engage with an engagement feature of the applicator assembly 200 for purposes of coupling the applicator assembly 200 to the container 100. The first engagement feature 113 may comprise a first set of screw threads 114 located on the outer surface of the neck portion 111. The neck portion 111 may be formed entirely from the inner housing 190, as best shown in FIG. 3.

The first set of screw threads 114 may be half turn threads with multiple start points. The term half turn threads means that the cap 210 of the applicator assembly 200 may be completely attached to the container 100 with only a half turn (approximately 180°, with approximately being plus or minus 5°) of the cap 210 relative to the container 100. Thus, the threads of the first set of screw threads 114 may extend around approximately 180° or halfway around the circumference of the neck portion 111 of the container 100. Upon a half turn of the cap 210 relative to the container 100, the cap 210 may not be capable of turning any further relative to the container 100 and the cap 210 may be fully attached to the container 100. This feature helps to ensure that after each use of the tooth whitening apparatus 1000, the user will fully and securely couple the applicator assembly 200 back onto the container 100 to seal the cavity 105 of the container 100. Specifically, this avoids the situation of a person getting lazy and not sufficiently rotating the cap 210 relative to the container 100 to achieve a secure and complete coupling. This is important to prevent the tooth whitening composition 500 in the cavity 105 of the container 100 from drying out or otherwise becoming unusable. As discussed below, the tooth whitening composition 500 may comprise hydrogen peroxide and an alcohol. Thus, a complete seal of the cavity 105 is necessary to ensure that the alcohol does not evaporate and render the tooth whitening composition 500 inoperable. By using half turn threads, a user will easily and readily fully attach the applicator assembly 200 (specifically the cap 210 thereof) onto the container 100 to seal the cavity 105 and prevent product loss through evaporation.

The threads may include a feature at the bottom end thereof which creates an audible and/or tactile click when the cap 210 is fully seated on the container 100 so serve as an indication mechanism for a user due to the importance of the seal.

Figure 5:
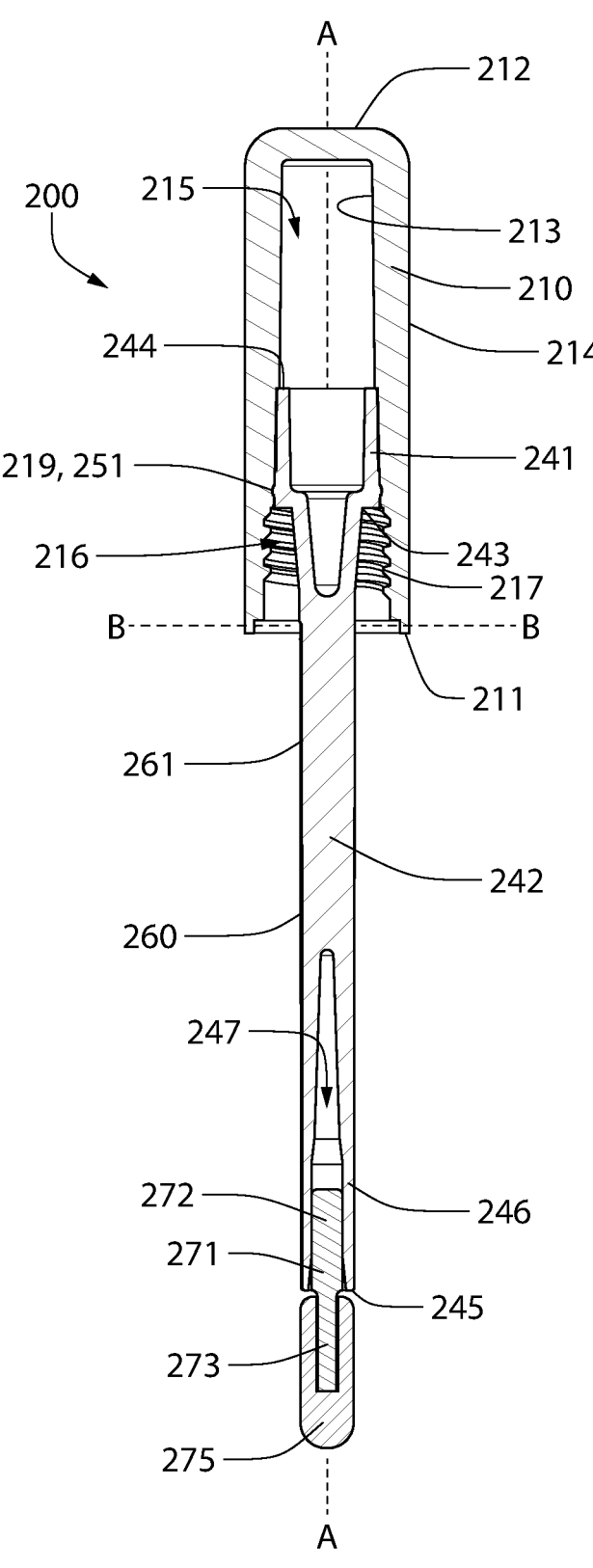
FIG. 5 is a cross-sectional view taken along line V-V of FIG. 2.

Referring to FIGS. 2, 3, and 5, the applicator assembly 200 will be described in greater detail. The cap 210 of the applicator assembly 200 comprises a bottom end 211, a top end 212, an inner surface 213, and an outer surface 214. The inner surface 213 of the cap 210 defines a cap cavity 215 that is open at the bottom end 211 of the cap 210 and closed at the top end 212 of the cap 210. The cap 210 may comprise a second engagement feature 216 located along the inner surface 213 of the cap 210 adjacent to the bottom end 211. In the exemplified embodiment, the second engagement feature 216 is a second set of screw threads 217. The cap 210 may be configured to be screwed onto the container 100 via engagement between the second set of screw threads 217 of the cap 210 and the first set of screw threads 114 of the container 100. Of course, other closure features and techniques may be used in other embodiments, including friction fit, interference fit, latches, mechanical locking features, or the like. The cap 210 may form a handle that is held by the user during use of the applicator assembly 200 to apply the tooth whitening composition onto a user's teeth.

The rod member 240 may be coupled to the inner surface 213 of the cap 210. The rod member 240 may comprise a head portion 241 that is fixedly coupled to the inner surface 213 of the cap 210 and an elongated rod portion 242 that extends from a bottom end of the head portion 241. The head portion 241 may be coupled to the inner surface 213 of the cap 210 via ultrasonic welding, heat staking, adhesives, mechanical interference, or the like in various different embodiments. The head portion 241 may comprise an annular protrusion 251 that nests within an annular groove 219 formed into the inner surface 213 of the cap 210 to facilitate or assist in the coupling of the rod member 240 to the cap 210. Alternatively, the protrusion may be on the inner surface 213 of the cap 210 and the groove may be on the head portion 241. The head portion 241 may comprise a downwardly facing shoulder 243 that surrounds the elongated rod portion 242. With the rod member 240 coupled to the cap 210, the elongated rod portion 242 of the rod member 240 protrudes from the bottom end 211 of the cap 210. The rod member 240 is elongated along a longitudinal axis A-A from a proximal end 244 to a distal end 245. The downwardly facing shoulder 243 may be oriented perpendicularly to the longitudinal axis A-A.

The second engagement feature 216 (e.g., the second set of screw threads 217) may be located between the downwardly facing shoulder 243 of the head portion 241 of the rod member 240 and the bottom end 211 of the cap 210. The second engagement feature 216 may start immediately below the downwardly facing shoulder 243 to ensure that the downwardly facing shoulder 243 seals tightly against the wiper component 300 to seal the cavity 105 as described below with reference to FIGS. 7A and 8. The portion of the elongated rod portion 242 which is located within the cap cavity 215 is spaced apart from the inner surface 213 of the cap 210. The neck portion 111 of the container 100 may be positioned in the space between the portion of the elongated rod portion 242 which is located within the cap cavity 215 and the inner surface 213 of the cap 210 when the applicator assembly 200 is coupled to the container 100 (see FIG. 7A).

The elongated rod portion 242 may comprise a distal portion 246 which comprises the distal end 245. The distal portion 246 of the elongated rod portion 242 may comprise a distal-most one-fifth of the elongated rod portion 242, or a distal-most one-tenth of the elongated rod portion 242, or anything in between, in various different embodiments. The distal portion 246 of the elongated rod portion 242 may comprise a hollow interior 247. The hollow interior 247 facilitates the attachment of the applicator tip 270 to the rod member 240 in accordance with the exemplified embodiment. However, it should be appreciated that in other embodiments the distal portion 246 of the elongated rod portion 242 may be solid and non-hollow and the applicator tip 270 may be coupled to the rod member 240 in other ways. Additional details about the elongated rod portion 242 will be provided below with reference to FIGS. 6A-6C.

The applicator tip 270 may comprise the attachment rod 271 and the tip member 275, as mentioned above. The attachment rod 271 may comprise a first portion 272 that nests within the hollow interior 247 of the rod member 242 and a second portion 273 that protrudes from the distal end 245 of the elongated rod portion 242 of the rod member 240. The first portion 272 of the attachment rod 271 may be affixed to the elongated rod portion 242 of the rod member 240 using adhesives, welding, heat staking, or the like.

Figure 9:
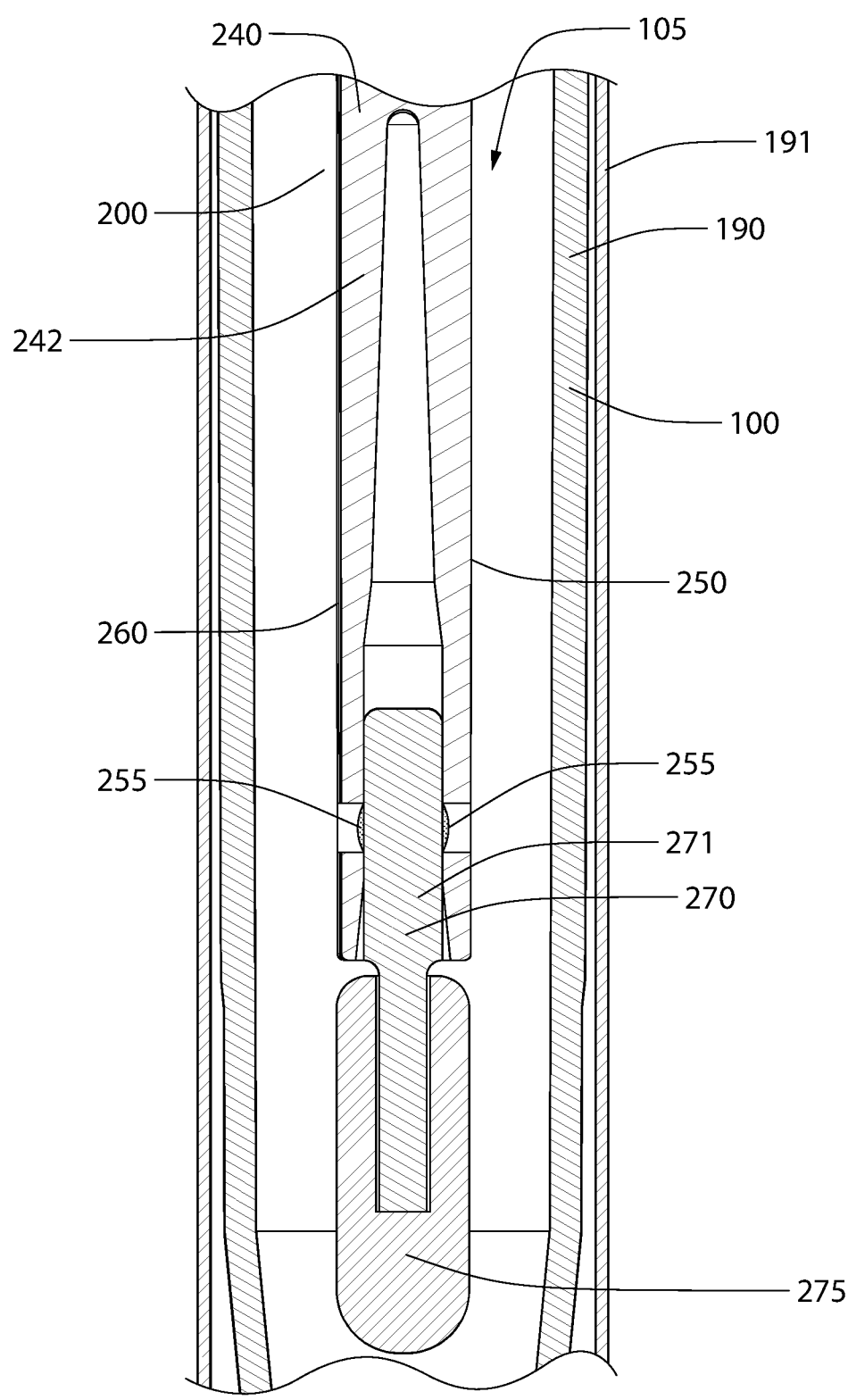
FIG. 9 is a close-up view of area IX of FIG. 7A in accordance with an embodiment of the present invention.

Referring briefly to FIG. 9, one exemplary process that may be used to affix the first portion 272 of the attachment rod 271 of the applicator tip 270 to the elongated rod portion 242 of the rod member 240 is a heat staking process. In such a process, after inserting the first portion 272 of the attachment rod 271 into the hollow interior 247, two pins or horns (tooling that may be used in the joining process) may be applied onto opposite sides of the elongated rod portion 242 along the distal portion 246 thereof. The pins or horns may cause the material of the elongated rod portion 242 to collapse or deform due to the application of heat or ultrasonic means. This results in the formation of two dimpled welds 255, one on each side of the elongated rod portion 242. The two dimpled welds 255 is a physical deformation of the elongated rod portion 242 which creates some level of gross interference between the elongated rod portion 242 and the attachment rod 270. The two dimpled welds may be 180° apart. While the heat staking process is one way that the attachment rod 271 may be affixed to the elongated rod portion 242 of the rod member 240, other techniques may be used including traditional ultrasonic welding, adhesives, or mechanical stakes or punches or squeezes that cause physical deformation of one plastic material (the elongated rod portion 242 of the rod member 240) into another (the first portion 271 of the attachment rod 270) creating some level of gross interference.

While the first portion 272 of the attachment rod 270 is positioned within the hollow interior 247 of the rod member 240, the second portion 273 of the attachment rod 270 protrudes from the distal end 245 of the rod member 240. Furthermore, the tip member 275 is coupled to the second portion 273 of the attachment rod 270. The tip member 275 may be coupled to the second portion 273 of the attachment rod 270 via adhesives, ultrasonic means, or the like. The tip member 275 surrounds the second portion 273 of the attachment rod 270 and forms an extension of the elongated rod portion 242 of the rod member 240. The tip member 275 may be formed from polyurethane foam as noted above, or other types of foam materials which are compatible with the chemical composition of the tooth whitening composition 500 stored in the cavity 105 of the container 100. Thus, the material used to form the foam may be dictated, at least on part, by the specific formula of the tooth whitening composition that it is configured to apply to a user's teeth. The tip member 275 may abut directly against the distal end 245 of the rod member 240 or may be slightly spaced from the distal end 245 of the rod member 240.

Figures 6A, 6B, 6C:
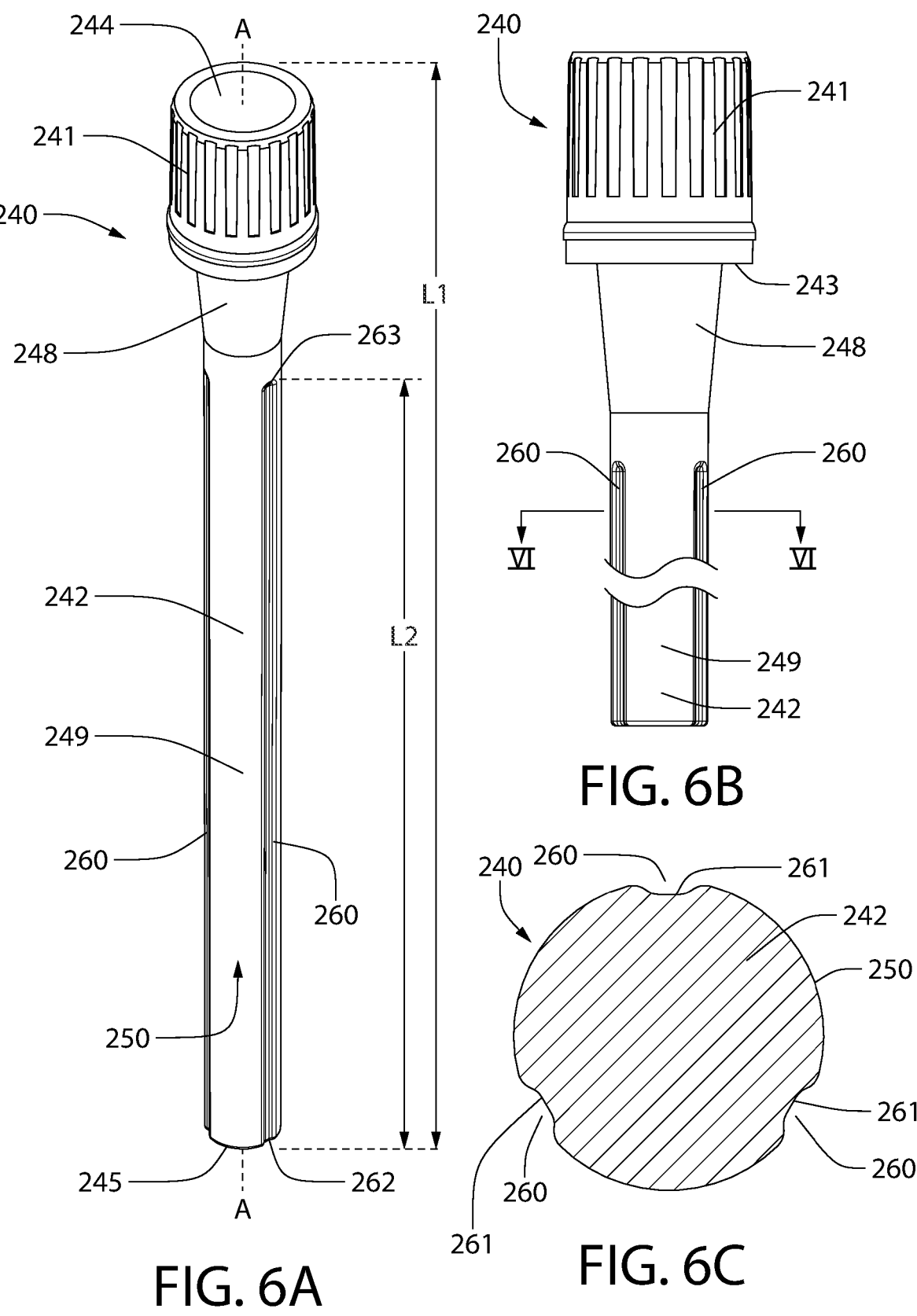
FIG. 6A is a top perspective view of a rod member of the applicator assembly of the tooth whitening apparatus of FIG. 1.
FIG. 6B is a partial front view of the rod member of FIG. 6.
FIG. 6C is a cross-sectional area taken along line VI-VI of FIG. 6B.

Referring to FIGS. 6A-6C concurrently, additional features of the rod member 240 of the applicator assembly 200 will be described. As mentioned previously, the rod member 240 comprises the head portion 241 which is coupled directly to the cap 210 and the elongated rod portion 242 which extends downwardly from the head portion 241. A lower surface of the head portion 241 forms the downwardly facing shoulder 243 that surrounds the elongated rod portion 242. The elongated rod portion 242 of the rod member 240 comprises a first portion 248 which extends directly from the head portion 241 and a second portion 249 which extends from the first portion 248 to the distal end 245 of the rod member 240. In the exemplified embodiment, the first portion 248 has a conical shape with a diameter that decreases as it moves further away from the head portion 241. In the exemplified embodiment, the second portion 249 has a cylindrical shape with a constant diameter all the way from the first portion 248 to the distal end 245. In other embodiments, the first portion 248 may be omitted such that the second portion 249 may be connected directly to the head portion 241 and extend to the distal end 245.

The elongated rod portion 242 of the rod member 240 comprises an outer surface 250. Furthermore, there are a plurality of vent grooves 260 formed into the outer surface 250 of the elongated rod portion 242 of the rod member 240. In the exemplified embodiment, there are three of the vent grooves 260 formed into the outer surface 250 of the elongated rod portion 242 of the rod member 240. However, the invention is not to be so limited in all embodiments. In some embodiments, there may be just one of the vent grooves 260. In some embodiments, there may be two of the vent grooves 260. In some embodiments there may be three, or four, or five, or six, or seven, or eight, or nine, or ten, etc. of the vent grooves 260.

The vent grooves 260 are formed as elongated grooves or channels comprising a floor 261 that is recessed relative to the outer surface 250 of the rod member 240. Furthermore, the vent grooves 260 are elongated in a direction of the longitudinal axis A-A. The vent grooves 260 may extend from the distal end 245 of the rod member 240 axially in a direction towards the head portion 241 of the rod member 240. In the exemplified embodiment, the vent grooves 260 terminate at the distal end 245 of the rod member 240. In the exemplified embodiment, the rod member 240 has a first length L1 measured from the proximal end 244 to the distal end 245. The vent grooves 260 may extend along a majority of the first length L1 of the rod member 240 (with majority being any amount greater than one-half). In the exemplified embodiment, each of the vent grooves 260 has a second length L2 measured from a first end 262 of the vent grooves 260 to a second end 263 of the vent grooves 260. The second length L2 may be between 60% and 90%, or more specifically between 65% and 85%, or more specifically between 70% and 80% of the first length L1. Having the vent grooves 260 extend to the distal end 245 of the rod member 240 ensures that venting occurs from the moment that the rod member 240 is inserted into the cavity 105 of the container 100.

The vent grooves 260 may extend only along the second portion 249 of the elongated rod portion 242 of the rod member 240 and not along the first portion 248 of the elongated rod portion 242 of the rod member 240. In the exemplified embodiment, the second end 263 of the vent grooves 260 is located adjacent, but slightly spaced, from the first portion 248 of the elongated rod portion 242. In other embodiments, the vent grooves 260 may extend along the entirety of the second portion 249 of the elongated rod portion 242. In still other embodiments, the vent grooves 260 may also extend along a portion or the entirety of the first portion 248 of the elongated rod portion 242.

As noted above, in the exemplified embodiment there are three of the vent grooves 260. Furthermore, the vent grooves 260 are equidistantly spaced apart from one another along the circumference of the elongated rod portion 242 of the rod member 240. Thus, there being three of the vent grooves 260, each of the vent grooves 260 is spaced 120° from each adjacent one of the vent grooves 260. In some embodiments, there is a preference to have at least two of the vent grooves 260 that are spaced apart in a circumferential direction by less than 180°. The reason for this is to ensure that the locations at which the attachment rod 271 is attached (welded, heat staked, or the like) to the elongated rod portion 242 does not block all of the vent grooves 260. Since the locations at which the attachment rod 271 is attached to the elongated rod portion 242 may be 180° apart (see, for example, FIG. 9 described above), having the vent grooves 260 spaced a distance that is different than 180° ensures that at least one of the vent grooves 260 will not be located at one of the attachment locations (i.e., the dimpled welds 255) between the attachment rod 271 and the elongated rod portion 242.

The vent grooves 260 extend along a majority of the length of the rod member 240 as mentioned above. As shown in FIG. 5, a portion of the vent grooves 260 may be transversely aligned with the cap 210. That is, a transverse axis B-B that is perpendicular to the longitudinal axis A-A may intersect a portion of the vent grooves 260 and the cap 210.

The function of the vent grooves 260 is to reduce a pressure in the cavity 105 of the container 100 when the applicator assembly 200 is being altered from the detached state to the attached state. During development of the tooth whitening apparatus 1000 and prior to adding the vent grooves 260 to the rod member 240, it was determined that there was too much pressure in the cavity 105 of the container 100 to easily facilitate the attachment of the applicator assembly 200 to the container 100. Specifically, during attempts to attach the applicator assembly 200 (without the vent grooves 260) to the container 100, the pressure in the cavity made it difficult to facilitate the attachment of the applicator assembly 200 and would result in the applicator assembly 200 acting like a missile if the user released the applicator assembly 200 while attempting to couple the applicator assembly 200 to the container 100. That is, releasing the applicator assembly 200 (without the vent grooves 260) while attempting to attach the applicator assembly 200 to the container 100 resulted in the pressure in the cavity 105 forcibly propelling the applicator assembly 200 away from the container 100. The vent grooves 260 in the rod member 240 reduce the pressure in the cavity 105 of the container 100 during the insertion of the rod member 240 into the cavity 105 of the container 100 and facilitate an easy attachment of the applicator assembly 200 to the container 100.

The pressure build-up in the cavity 105 may be driven by the tight fight of the wiper component 300 and the rod member 240 together with the high vapor pressure of ethanol in the tooth whitening composition 500 (as discussed below, the tooth whitening composition 500 may comprise hydrogen peroxide, a polar solvent (i.e., alcohol, which may be ethanol), a copolymer, and water). In particular, the vapor pressure of ethanol is about three times higher than the vapor pressure of water. As a result, on insertion of the rod member 240 into the cavity 105, the headspace is being compressed which increases the pressure in the cavity 105 and leads to the rod member 240 reacting unless the atmosphere in the cavity 105 is released as the rod member 240 is inserted. This is achieved in accordance with the present invention with the incorporation of the vent grooves 260 in the elongated rod portion 242 of the rod member 240. Of course, the structures described herein may be utilized with other compositions in other embodiments.

Figures 7A, 7B:
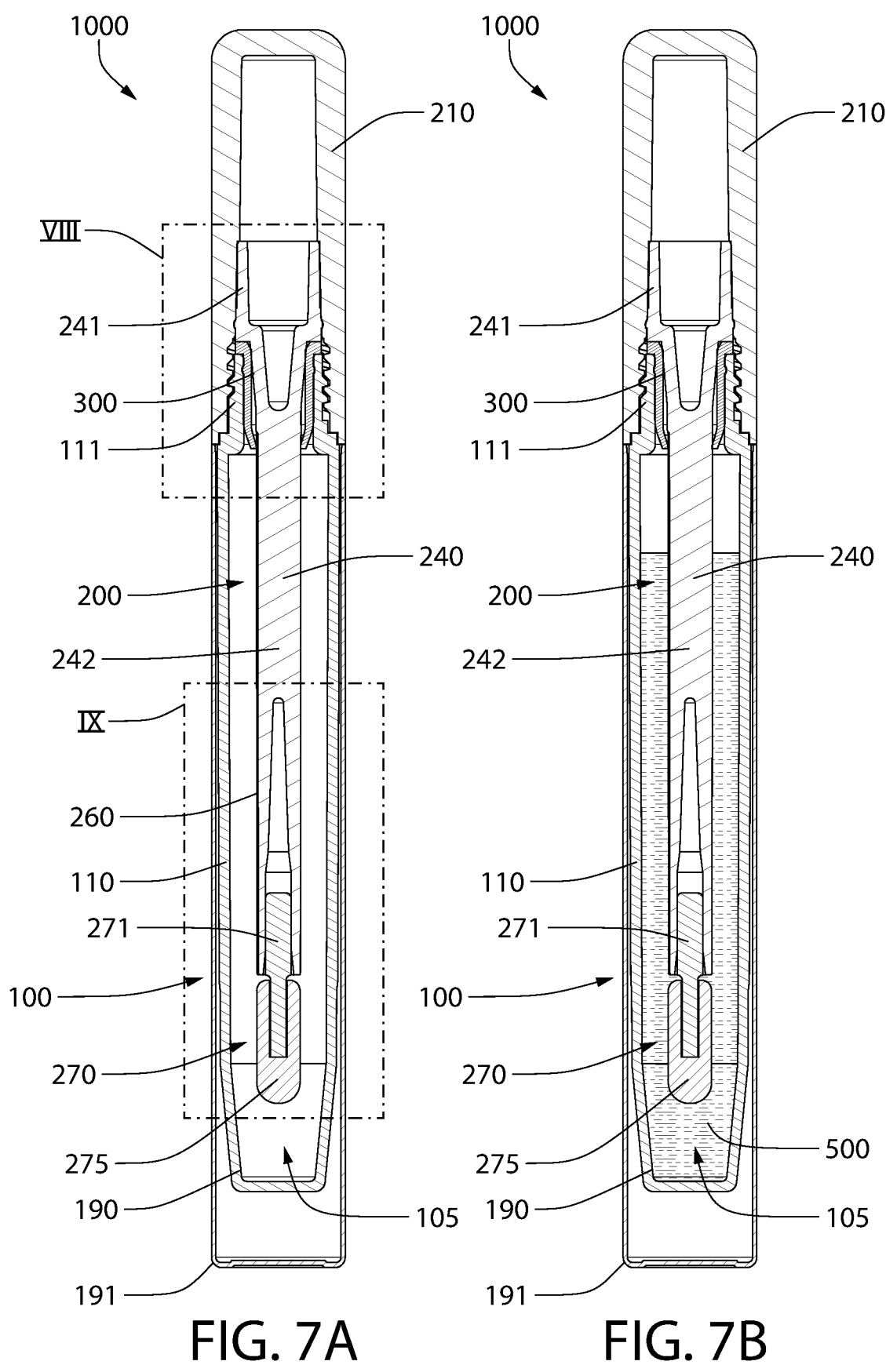
FIG. 7A is a cross-sectional view taken along line VII-VII of FIG. 1.
FIG. 7B is the cross-sectional view of FIG. 7A with a tooth whitening composition in a cavity of the container.
Figure 8:
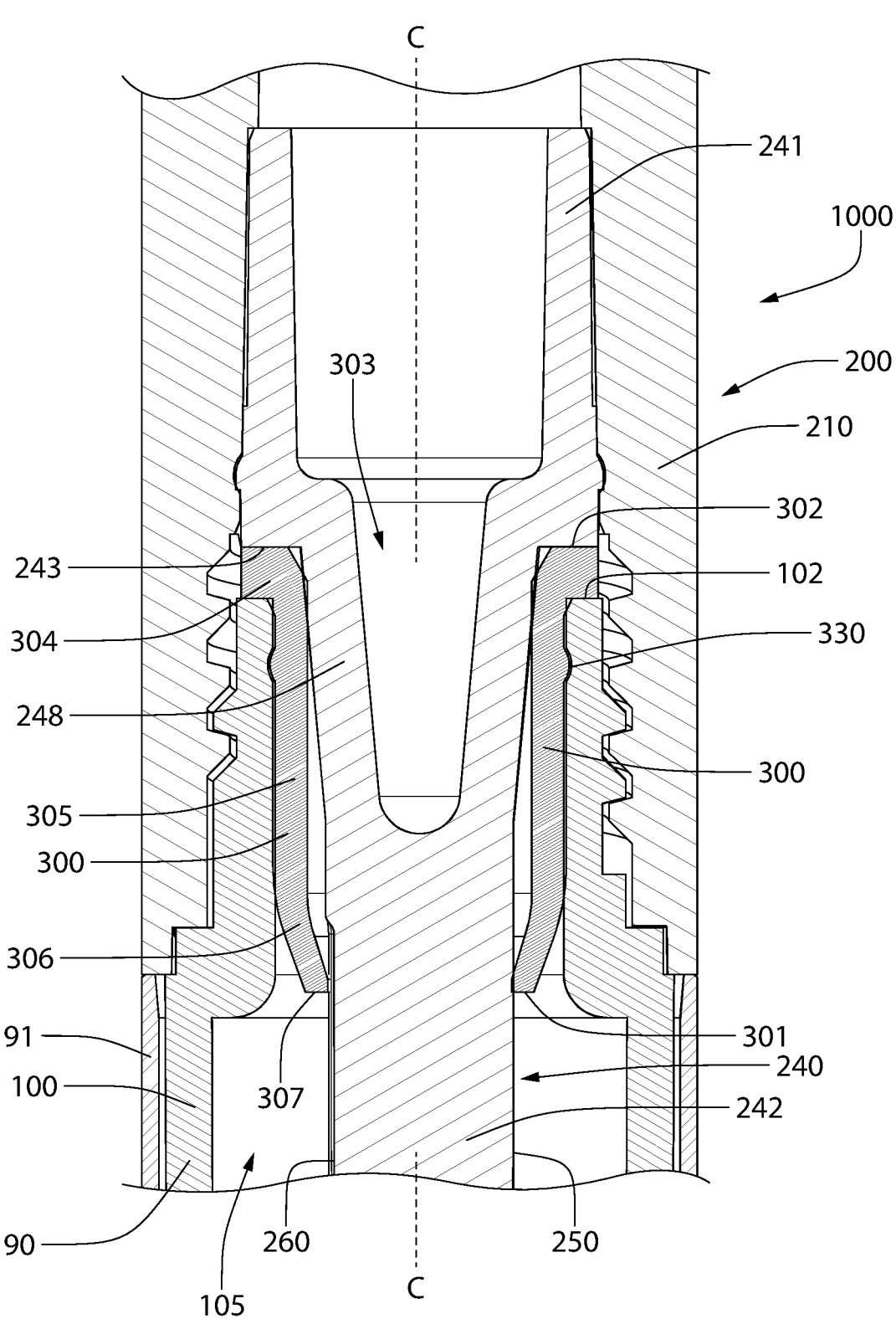
FIG. 8 is a close-up view of area VIII of FIG. 7A.

Referring to FIGS. 7A and 8, the tooth whitening apparatus 1000 is illustrated with the applicator assembly 200 in the attached state. As noted previously, the wiper component 300 is coupled to the container 100. The wiper component 300 comprises a bottom end 301, a top end 302, and a passageway 303 extending from the bottom end 301 to the top end 302. When the applicator assembly 200 is in the attached state, a portion of the rod member 240 nests within the passageway 303 of the wiper component 300. More specifically, in the exemplified embodiment at least the first portion 248 (or a portion thereof) of the elongated rod portion 242 of the rod member 240 nests within the passageway 303 of the wiper component 300. The wiper component 300 further comprises a flange portion 304 and a body portion 305 that extends downwardly from the flange portion 304 to the bottom end 301. The body portion 305 comprises a wiper portion 306 that is angled inwardly towards a passageway axis C-C of the passageway 303 moving in a direction towards the bottom end 301 of the wiper component 300. The wiper portion 306 terminates in an annular distal edge 307, which forms the bottom end 301 of the wiper component 300.

In the exemplified embodiment, the wiper portion 306 comprises an inner diameter at the annular distal edge 307 which is less than the diameter of the elongated rod portion 242 of the rod member 240. As such, the annular distal edge 307 of the wiper component 300 is in contact with the outer surface 250 of the rod member 240 when the applicator assembly 200 is in the attached state. Then, as the applicator assembly 200 is altered from the attached state to the detached state, the annular distal edge 307 of the wiper component 300 slides along the outer surface 250 of the elongated rod portion 242 and wipes excess amounts of the tooth whitening composition off of the outer surface 250 of the elongated rod member 242 of the rod component 240 to make for a mess free application. As the wiper component 300 contacts the tip member 275, the wiper component 300 wipes excess amounts of the tooth whitening composition off the tip member 275 so that the same dose of tooth whitening composition exists on the tip member 275 each time the applicator assembly 200 is altered from the attached state to the detached state, allowing for consistent dosing and application of the tooth whitening composition onto the user's teeth.

The wiper component 300 is coupled to the container 100 and located within the neck portion 111 of the container 100. In the exemplified embodiment, the wiper component 300 is located entirely within the neck portion 111 of the container 100. However, in other embodiments the wiper component 300 may extend into the main body portion 110 of the container 100. The wiper component 300 and the inner surface of the neck portion 111 of the container 100 may have corresponding indent/detents 330 to facilitate the attachment between the wiper component 300 and the container 100. The wiper component 300 may also be affixed to the container 100 with adhesives, ultrasonic means, or the like, including other techniques described herein for attaching two components together.

The wiper component 300 is positioned so that the flange 304 of the wiper component 300 rests atop of the top end 102 of the container 100 and the body portion 305 of the wiper component 300 is located within the neck 111 of the container 100. The distal end 301 of the wiper component 300 is transversely aligned with a portion of the vent grooves 260 when the applicator assembly 200 is in the attached state. The vent grooves 360 extend past the distal end 307 of the wiper component 300 when the applicator assembly 200 is fully coupled/engaged to the container 100. That is, at least a portion of the wiper portion 306 of the wiper component 300 extends axially along a portion of the vent grooves 260. Stated another way, a portion of the vent grooves 260 is located within the passageway 303 of the wiper component 300. This ensures that air in the cavity 105 can exit the cavity 105 during the entire process of attaching the applicator assembly 200 to the container 100.

When the applicator assembly 200 is in the attached state, the downwardly facing shoulder 243 of the head portion 241 of the rod member 240 is in abutting surface contact with the top end 302 of the wiper component 300. This contact between the downwardly facing shoulder 243 of the head portion 241 of the rod member 240 and the top end 302 of the wiper component 300 seals the cavity 105 and prevents evaporation of its contents. In the exemplified embodiment, the half-turn of the cap 210 relative to the container 100 brings the downwardly facing shoulder 243 into contact with the top end 302 of the wiper component 300 to seal the cavity 105.

FIG. 7B is illustrates the tooth whitening apparatus 1000 with the applicator assembly 200 in the attached state just like FIG. 7A, except that in FIG. 7B the tooth whitening composition 500 is located within the cavity 105 of the container 100. The tip member 275 of the applicator tip 270 is immersed within the tooth whitening composition 500 to load the tip member 275 with the tooth whitening composition 500. As noted above, altering the applicator assembly 200 from the attached state to the detached state will cause the wiper component 300 to wipe excess amounts of the tooth whitening composition 500 off the tip member 275 so that a proper dose of the tooth whitening composition 500 is present on the tip member 275 for application to a user's tooth or teeth. Portions of the elongated rod member 242 are also immersed within the tooth whitening composition, at least until the tooth whitening composition 500 is mostly depleted.

In the exemplified embodiment, the tooth whitening composition 500 may comprise hydrogen peroxide, a polar solvent (i.e., alcohol, which in one preferred embodiment is ethanol), a copolymer, and water. In some embodiments, the ethanol may have a weight percentage in a range of 60 wt % to 80 wt %, more specifically 70 wt % to 80 wt %, and still more specifically approximately 76 wt % of the tooth whitening composition 500. When the tooth whitening composition 500 is applied onto a user's teeth, the alcohol quickly evaporates. As a result, the weight percentage of the hydrogen peroxide in the tooth whitening composition 500 increases with the evaporation of the alcohol, thereby resulting in a more effective tooth whitening composition 500 in terms of tooth whitening efficacy (change in color per treatment) and efficiency (change in color per minute of treatment time). Similarly, if the tooth whitening device 1000 is not sealed as described herein, the alcohol may evaporate rendering the tooth whitening composition 500 ineffective.

Although the invention is described herein whereby there is a tooth whitening composition 500 in the cavity 105 of the container 100, the invention is not to be so limited in all embodiments. The composition or formula or solution or agent in the cavity 105 of the container 100 may take on other forms, including acne treatment compositions or other dermatological compositions, lip treatment compositions, hair treatment compositions, skin treatment compositions, nose treatment compositions, ear treatment compositions, or the like. Thus, the apparatus described herein may be used for tooth whitening, but may also be used for other purposes in other embodiments.

The tooth whitening composition 500 may contain hydrogen peroxide in a range of from about 0.1% to about 10% by weight (the term "about" including plus or minus 5% of the value provided, as in 0.05 multiplied by the percentage listed so "about 10 wt %" includes a range of 9.5 wt % to 10.5 wt % and "about 0.1 wt %" includes a range of 0.095 wt % to 0.105 wt %). In some embodiments the hydrogen peroxide may be in a range of about 0.1 wt % to about 35 wt %. In some embodiments, the tooth whitening composition 500 may contain hydrogen peroxide having a weight percentage of 0.1% or less, or in some embodiments about 0.1%. In other embodiments, the tooth whitening composition 500 may contain hydrogen peroxide having a weight percentage of about 3%, or about 4.5%, or about 6%, or about 10%. In some embodiments, the copolymer of the tooth whitening composition 500 may be a film forming hydrophobic polymer consisting essentially of 2-propenoic acid, 2-methyl-, 2-methylproypl ester, polymer with 2-propenoic acid and N-(1,1,3,3-tetramethylbutyl)-2-propenamide, Acrylates/Dimethylaminoethyl Methacrylate copolymer, or mixtures thereof. The polar solvent may be an alcohol, and more specifically ethanol. Additional details about the tooth whitening composition 500 in accordance with one embodiment of the present invention are described in U.S. Pat. No. 10,821,066, the entirety of which is incorporated herein by reference.

The tooth whitening composition 500 may be a different formula than the above in other embodiments and the invention is not to be limited by the specific chemical composition of the tooth whitening composition 500 unless the same is specified in the claims.

Figure 10:
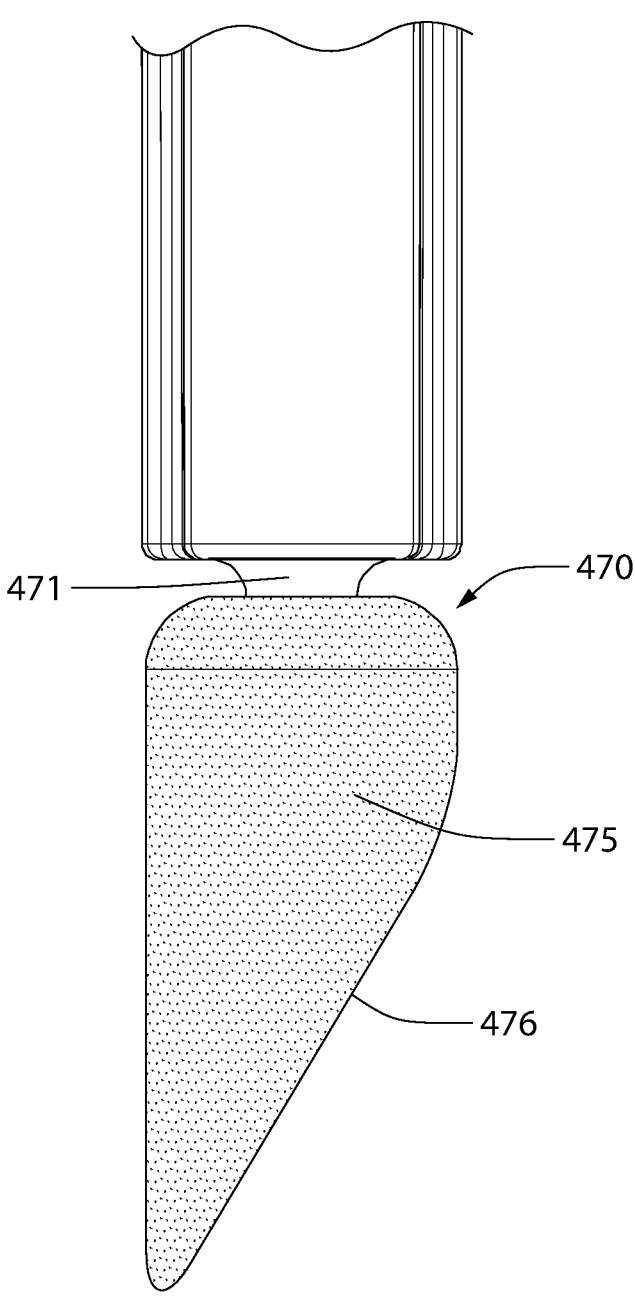
FIG. 10 is a view of an applicator tip of an applicator assembly in accordance with an alternative embodiment of the present invention.

Referring briefly to FIG. 10, an applicator tip 470 is illustrated in accordance with an alternative embodiment. The applicator tip 470 comprises an attachment rod 471 and a tip member 475. The applicator tip 470 is identical to the applicator tip 270 except that the tip member 475 has a different shape than the tip member 275. That is, the tip member 275 has a rounded distal end, and the tip member 475 has an angled application surface 476 designed to enhance the application of the tooth whitening composition onto the user's teeth. Either of the tip members 275, 475 may satisfactorily apply the tooth whitening composition onto a user's teeth and in fact the tip member may take on other shapes as may be desired to enhance the application.

To use the tooth whitening apparatus 1000, a user first alters the applicator assembly 200 from the attached state to the detached state. The tooth whitening composition 500 is automatically present on the tip member 275 due to it having been immersed in the tooth whitening composition 500 in the cavity 105 of the container 100. The user then directly contacts the teeth with the tip member 275, thereby applying the tooth whitening composition 500 onto the teeth. The user may need to dip the tip member 275 back into the tooth whitening composition 500 in the cavity 105 of the container 100 during a treatment session in order to properly coat all of the desired teeth with the tooth whitening composition 500. Once the treatment session is completed, the user alters the applicator assembly 200 back into the attached state so that the cavity 105 is sealed. By placing the applicator assembly 200 back into the attached state, there is also no opportunity for any excess amounts of the tooth whitening composition 500 located on the tip member 275 to clump and harden. Rather, because the applicator tip 275 is immersed back into the tooth whitening composition 500 in the cavity 105 of the container 100, any amounts of the tooth whitening composition 500 located on the tip member 275 that may have begun to harden as the alcohol evaporates will redissolve back into the supply of the tooth whitening composition 500 in the cavity 105.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A tooth whitening apparatus comprising:
a container comprising a first engagement feature and a cavity containing a tooth whitening composition;
an applicator assembly comprising:
a cap comprising a second engagement feature;
a rod member coupled to the cap and protruding from a bottom end of the cap, the rod member comprising a longitudinal axis, an outer surface, and a distal portion; and
an applicator tip coupled to the distal portion of the rod member;
wherein the applicator assembly is alterable between: (1) an attached state whereby at least a portion of the rod member and the applicator tip are located within the cavity of the container and the second engagement feature of the cap engages with the first engagement feature of the container to couple the applicator assembly to the container and seal the cavity; and (2) a detached state whereby the applicator assembly is separated from the container and the applicator tip is configured to apply the tooth whitening composition onto a user's teeth; and
wherein the outer surface of the rod member comprises at least one vent groove that is elongated in a direction of the longitudinal axis to reduce a pressure in the cavity of the container when altering the applicator assembly into the attached state.

2. The tooth whitening apparatus according to claim 1 further comprising a plurality of the vent grooves that are equidistantly spaced apart along a circumference of the outer surface of the rod member.

3. The tooth whitening apparatus according to claim 2 wherein the plurality of vent grooves consists of three of the vent grooves that are spaced 120° apart from one another along the outer surface of the rod member.

4. The tooth whitening apparatus according to claim 1 wherein the rod member terminates at a distal end, and wherein the at least one vent groove extends from the distal end of the rod member towards the cap along a majority of a length of the rod member.

5. The tooth whitening apparatus according to claim 4 wherein a portion of the at least one vent groove is transversely aligned with the cap so that a transverse axis that is perpendicular to the longitudinal axis intersects the cap and the at least one vent groove.

6. The tooth whitening apparatus according to claim 5 wherein the container comprises a main body portion and a neck portion, and wherein the portion of the at least one vent groove is located within the neck portion of the container when the applicator assembly is in the attached state.

7. The tooth whitening apparatus according to claim 1 wherein the at least one vent groove comprises a floor that is recessed relative to the outer surface of the rod member.

8. The tooth whitening apparatus according to claim 1 further comprising:
wherein the distal portion of the rod member comprises a hollow interior;
wherein the at least one vent groove comprises at least two of the vent grooves that are spaced apart along the outer surface of the rod member by a circumferential distance that is less than 180°;
wherein the applicator tip comprises:
an attachment rod comprising a first portion that nests within the hollow interior of the rod member and a second portion that protrudes from a distal end of the rod member; and
a tip member that is coupled to the second portion of the attachment rod;
wherein the first portion of the attachment rod is physically coupled to the distal portion of the rod member at two locations that are circumferentially spaced 180° apart, and wherein the vent grooves are circumferentially offset from the coupling locations such that at least one of the vent grooves remains unblocked by the coupling locations, thereby ensuring that at least one of the vent grooves is not blocked by the physical coupling between the attachment rod of the applicator tip and the rod member of the applicator assembly.

9. The tooth whitening apparatus according to claim 1 wherein the container comprises a main body portion and a neck portion, the neck portion having an outer surface with external screw threads that form the first engagement feature, and wherein the cap comprises an inner surface comprising internal screw threads that form the second engagement feature, and wherein the internal and external screw threads engage each other to attach the applicator assembly to the container.

10. The tooth whitening apparatus according to claim 9 wherein the external screw threads of the container comprises a half-turn thread with two starting points so that the cap of the applicator assembly is altered from the detached state to the attached state with a half-turn of the cap relative to the container.

11. The tooth whitening apparatus according to claim 1 further comprising a wiper component coupled to the container, the wiper component comprising a bottom end, a top end, and a passageway extending from the bottom end to the top end along a passageway axis so that a portion of the rod member nests within the passageway when the applicator assembly is in the attached state, the wiper component further comprising a flange portion that abuts against a top end of the container and a body portion extending downwardly from the flange portion to the bottom end of the wiper component, the body portion comprising a wiper portion that is angled inwardly towards the passageway axis moving in a direction towards the bottom end of the wiper component, the wiper portion terminating in an annular distal edge that forms the bottom end of the wiper component.

12. The tooth whitening apparatus according to claim 11 wherein the annular distal edge of the wiper portion contacts the rod member and wipes excess amounts of the tooth whitening composition off the rod member and the applicator tip as the applicator assembly is altered from the attached state to the detached state.

13. The tooth whitening apparatus according to claim 11 wherein the rod member of the applicator assembly comprises a head portion that is fixedly coupled to an inner surface of the cap and an elongated rod portion that extends from the head portion, the head portion having a downwardly facing annular shoulder that surrounds the elongated rod portion, and wherein when the applicator assembly is in the attached state the downwardly facing annular shoulder of the head portion is in contact with the flange portion of the wiper component to seal the cavity of the container.

14. The tooth whitening apparatus according to claim 13 wherein the inner surface of the cap comprises screw threads that are located between the downwardly facing annular shoulder of the head portion of the rod member and the bottom end of the cap, wherein the screw threads are configured to engage with the first engagement feature of the container to couple the applicator assembly to the container.

15. The tooth whitening apparatus according to claim 1 wherein the applicator tip comprises a polyurethane foam tip member.

16. The tooth whitening apparatus according to claim 1 wherein the tooth whitening composition comprises hydrogen peroxide and an alcohol.

17. An applicator apparatus comprising:
a container comprising a first set of screw threads and a cavity containing a composition;
a wiper component coupled to the container, the wiper component defining a passageway that extends along a passageway axis;
an applicator assembly comprising:
a cap comprising an inner surface that defines a cap cavity, the inner surface comprising a second set of screw threads that are configured to engage with the first set of screw threads to detachably couple the cap to the container to seal the cavity;
a rod member coupled to the inner surface of the cap and protruding from a bottom end of the cap, the rod member comprising a longitudinal axis and an outer surface having at least one vent groove that is elongated in a direction of the longitudinal axis along a majority of a length of the rod member and extending through the passageway of the wiper component to permit fluid communication between the cavity and the cap cavity while the rod member is received in the passageway; and
an applicator tip coupled to the rod member and configured to apply the composition onto a portion of a user when the applicator assembly is detached from the container.

18. The applicator apparatus according to claim 17 wherein the rod member terminates at a distal end, and wherein the at least one groove comprises a plurality of grooves that extend from the distal end of the rod member towards the cap.

19. The applicator apparatus according to claim 17 wherein a portion of the at least one groove is located within the cap cavity of the cap.

20. The applicator apparatus according to claim 17 wherein the rod member has a proximal end, a distal end, and a first length measured between the proximal and distal ends, and wherein each of the at least one groove has a second length, wherein the second length is between 60% and 90% of the first length.

* * * * *